United States Patent [19]
Garelick

[11] Patent Number: 6,042,093
[45] Date of Patent: Mar. 28, 2000

[54] BOAT SEAT SHOCK ABSORBER

[75] Inventor: Richard J. Garelick, Minneapolis, Minn.

[73] Assignee: Garelick Mfg. Co., St. Paul Park, Minn.

[21] Appl. No.: 09/006,061

[22] Filed: Jan. 12, 1998

[51] Int. Cl.[7] ...................................................... A47G 7/14
[52] U.S. Cl. .......................... 267/131; 267/117; 114/363
[58] Field of Search .................................... 267/131, 132, 267/133, 117; 297/344.13, DIG. 8; 248/619; 114/363, 188, 194, 343; 280/220, 226.1, 275, 281.1, 283

[56] References Cited

U.S. PATENT DOCUMENTS

| | | | |
|---|---|---|---|
| 3,536,313 | 10/1970 | Rice | 267/131 |
| 4,432,525 | 2/1984 | Duvall | 114/363 X |
| 5,154,402 | 10/1992 | Hill et al. | 267/133 |
| 5,367,978 | 11/1994 | Mardikian | 114/363 |
| 5,542,371 | 8/1996 | Harvey et al. | 114/363 |
| 5,899,780 | 5/1999 | Robbins | 440/105 |

*Primary Examiner*—Christopher P. Schwartz
*Assistant Examiner*—Pamela J. Lipka
*Attorney, Agent, or Firm*—Jacobson and Johnson

[57] ABSTRACT

A boat seat is pivotably hingedly attached along a line parallel to its front edge to a supporting member spaced below the boat seat with shock-absorbing resilient padding located in the spacing between the underside of the boat seat and the supporting member. Preferably the padding is slidably adjustable and also can be removed and replaced with padding of different durometers as necessary for differing conditions.

11 Claims, 4 Drawing Sheets

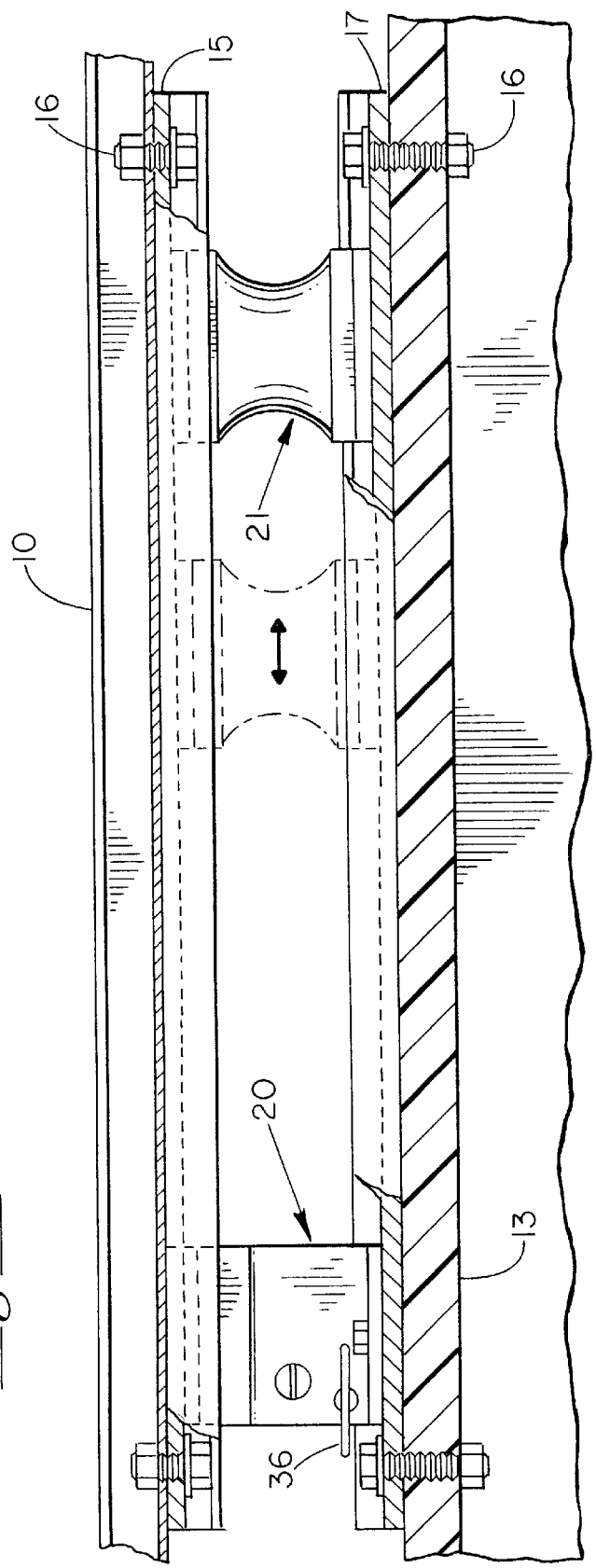

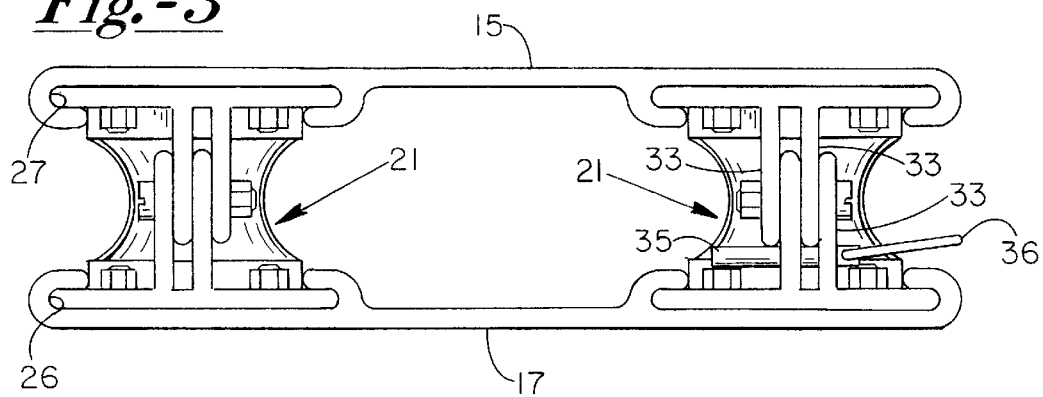
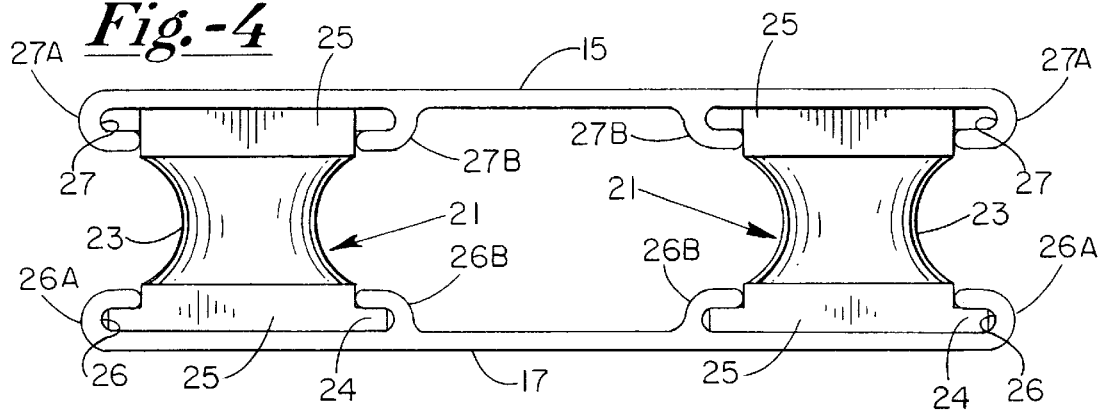
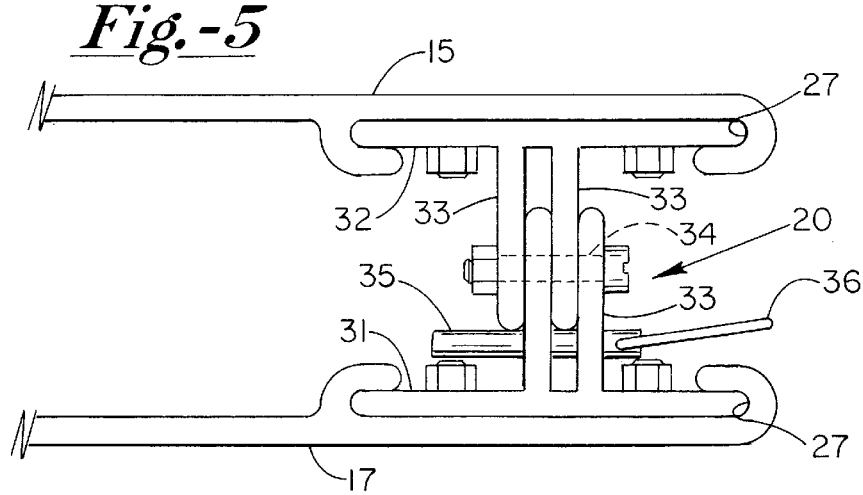

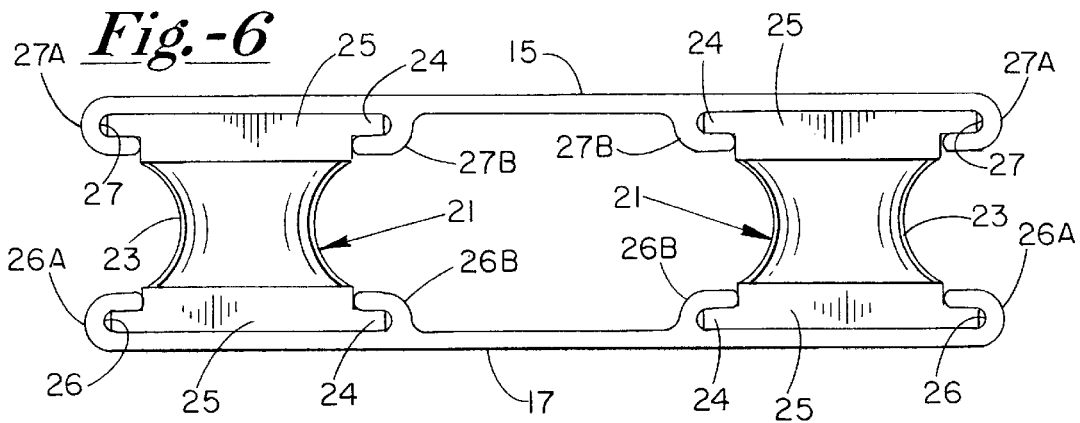
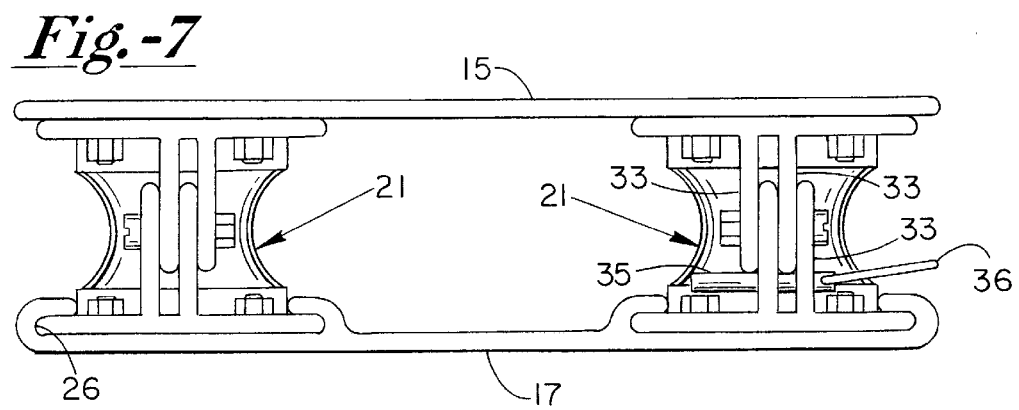
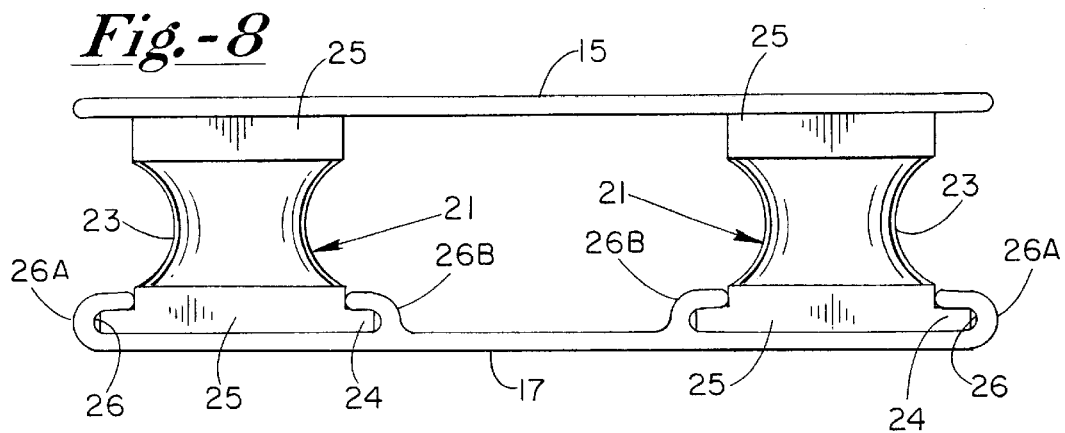

BOAT SEAT SHOCK ABSORBER

FIELD OF THE INVENTION

This invention is aimed at providing a cushioning or shock-absorbing or shock-attenuating benefit for boat operators, particularly for powered boats which encounter frequent impacts with natural waves or the wakes of other boats.

DESCRIPTION OF THE PRIOR ART

A power boat traveling along at a fair speed when it impacts a wave which may be a natural wave on the water or caused by the wake of another boat is subject to three forces around mutually orthogonal axes. These forces are technically and commonly referred to as "roll" which is a force about an axis which is in line with the direction that the boat is headed, "pitch" which is about an axis which is a line in the same plane as the roll axis but ninety degrees orthagonal to the roll axis, and "yaw" which is an axis along a line which is vertical to or ninety degrees from both the pitch and roll axes. Cushions on the top side of a boat seat will provide some cushioning or shock absorption of the impact on the boat operator's body, particularly on the spine or back, which is caused by the pitch component of the impacting force. But at the same time, a cushion also responds to the roll and yaw force components produced by the impact so that when the boat repeatedly impacts with waves or the wakes of other boats, the boat operator sitting on a cushion is likely to be subjected to swaying which can become bothersome. Also, seat cushions generally are selected for comfort and appearance and are not designed to absorb or attenuate the impact on the operator's back or spine. Also, what might be a suitable cushion for one operator may not be suitable for another.

SUMMARY OF THE INVENTION

A boat seat is pivotably hinged along a line parallel to the front edge of the boat seat, preferably close to the front edge, to a generally planar supporting member which is spaced below the underside of the boat seat Shock-absorbing or shock attenuating resilient padding is located in the space between the underside of the boat seat and the supporting member. The durometer and dimensions of the padding can be selected to suit the particular conditions under which the boat is to be operated and the bulk or size of the boat operator. Also, preferably the padding can be easily adjustably moved or changed so as to provide a different degree of shock absorption for differing impact conditions and/or different boat operators. If needed, a lock or stop is provided to prevent the boat seat from swinging upward beyond the spacing between the underside of the seat and the supporting member thereby preventing the boat operator from receiving a jolt as the boat seat rebounds due to the resiliency of the padding. Since the seat is hinged only along what would be called the pitch axis, the seat will only pivotally move or swing due to the pitch component of the impact force and therefore the operator won't be unduly swayed by the yaw and roll forces that normally are also produced at impact. In other words, the operator will be relatively stable on the seat for the most part yet will have the benefit of some shock absorption to help prevent soreness or damage to his or her back or spine.

BRIEF DESCRIPTION OF THE DRAWINGS

FIG. 2 is a partially sectioned side elevational view of a preferred form of the invention;

FIG. 3 is a front end view;

FIG. 4 is a rear or back end view; and

FIG. 5 is a somewhat enlarged detailed view of a hinge construction;

FIG. 6 is a rear or back end view of an alternative form of the invention;

FIG. 7 is a front end view of a variation of the preferred form of the invention; and FIG. 8 is a rear or back view of the variation shown in FIG. 7.

DESCRIPTION OF THE PREFERRED EMBODIMENTS

Figure 1:
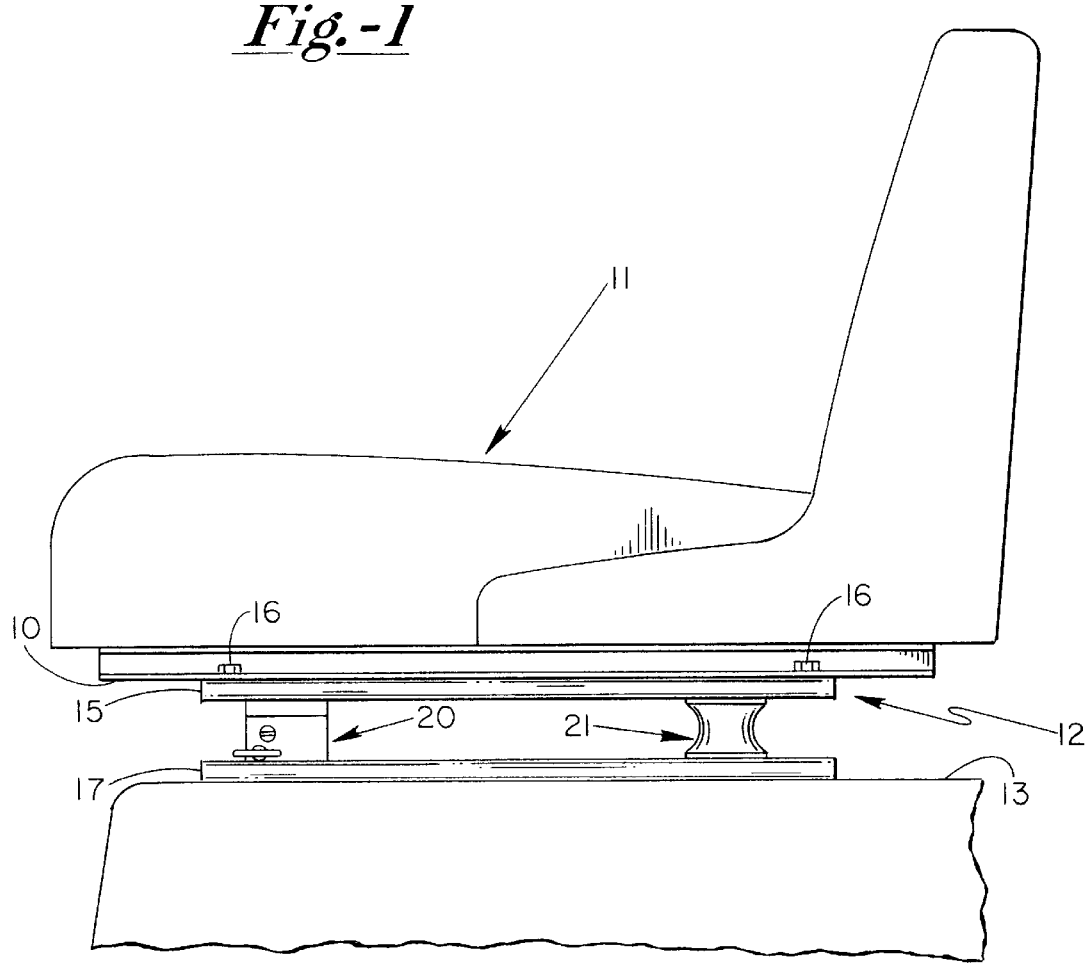
FIG. 1 is an elevated side view of a boat seat incorporating a preferred form of the invention.

The underside 10 of a boat seat 11 rests on a shock absorber assembly generally designated by reference numeral 12. In turn the shock absorber assembly 12 rests on a support platform generally designated by reference numeral 13 which, for example, may conventionally be the deck of a boat or the top of a raised support such as the top of a column or pillar which is supported by and rises up from the boat deck. As mentioned earlier, when the boat strikes natural waves or waves produced by the wakes of other boats the boat operator resting on the seat is subjected to pitch, roll and yaw impact forces. The present invention is aimed at providing protection for the boat operator from the forces which ordinarily would cause an impact on the operator's back or spinal column while he or she sits on the boat seat.

Shock absorber assembly 12 has an upper rigid, preferably metal, plate or planar member 15 which may be attached to the underside 10 of boat seat 11 by treaded bolts 16 through suitable openings, not shown, in planar member 15. Similar bolts 16 may also attach lower rigid plate or planar member 17 which is located and spaced below plate member 15 to a support surface 13 which conventionally may be, for example, the deck of a boat or the top of a raised column which is resting on the boat deck to provide an elevated boat seat Planar members 15 and 17 are pivotably or swingably joined together at a hinge generally designated by reference numeral 20 which preferably is located near or at the front edge of shock absorber 12 and in a line substantially parallel to the front edge of the boat seat. This line can be considered to be the boat seat pitch axis. As illustrated in FIG. 1, the front edge of shock absorber 12 may be spaced rearwardly from the front edge of boat seat 11. In the preferred form a pair of generally resilient or elastic shock-absorbing or shock-attenuating pads 21 are located in the space between members 15 and 17. When the boat is subjected to a significant force, such as encountered when the boat strikes a wave while traveling at a significant speed, the resulting force or impact normally transferred to the boat operator will be applied to the upper member 15 so that it will pivotally move or swing downward against pads 21 so that pads 21 will absorb, attenuate and/or cushion the impact and thereby reduce the impact on the boat operator's back or spinal column. The material and elasticity or resiliency chosen for the padding 21 should be such that while the padding provides attenuation of substantial forces that occur, it should not be such that it will respond to slight impacts which can be absorbed by a seat cushion or are of no danger or harm to the operator. The durometer of the material for pads 21 should be such that the pads compress when significant forces are applied yet have some resistance to returning to the original shapes to reduce the likelihood that oscillations will occur. In other words, it is intended to absorb and cushion the effect of the impact but at the same time, not to subject the boat operator to unduly vibratory or oscillatory up and down motions.

In the illustrated embodiments, each of the pads 21 has a substantial vertical middle columnar section 23 which terminates at each end with a block section 25. Generally the columnar section compresses and expands when subjected to the forces resulting from a wave impact A pair of parallel tracks 26 defined by side edges 26A and 26B are formed along the upper side of lower planar member 17. The lower block section 25 has an outward flaring flange 24 which is slidably engaged in tracks 26 and can be slidably moved back and forth as desired rearward of hinge 21. This provides an adjustability feature to accommodate different bulks or weights of different boat operators and to accommodate different conditions under which the boat is being operated. A recess, not shown, may be formed in the center at the outside of each flange 24 and a series of dimples or detents, also not shown, may be formed equally spaced along tracks 26 for engaging the recesses in the respective flanges to help locate and hold the pads in place.

Alternatively, as shown in FIG. 6, pads 21 may have a flange 24 also at the other end and a pair of parallel tracks 27 defined by edges 27A and 27B may be formed on the underside of upper plate member 15 for slidably engaging flanges 24. In this form, it is quite likely that stop or lock pin 35 would not be needed.

Generally speaking, hinge 20 can be of any construction suitable for the purpose. It should be strong enough to withstand the forces that are applied and should have the capability of allowing the upper member to swing downward against pads 21 during normal use yet allow the upper and lower members to be swung apart far enough if necessary to gain access to the interior space between the two members for repair or cleaning, etc. For example, a conventional piano hinge of suitable strength can be suitably attached between the upper and lower members near or at the front edge of the shock absorber assembly 12. An example of a hinge arrangement is shown in some detail in FIG. 5. This hinge structure is made up of two identical laterally spaced parts which are designated by the same reference numeral 20. Since the two parts are identical, only one will be described in detail.

A pair of opposite facing hinge plates 31 and 32 are attached respectively to planar members 17 and 15 by suitable screws or bolts. Extending downward from upper hinge plate 32 are a pair of spaced-apart arms 33 and extending upward from the lower hinge slide plate 31 are an identical pair of spaced-apart arms similarly identified by reference numeral 33. Hinge arms 33 are alternately located between one another with a hinge pin or bolt 34 passing through suitable apertures or holes, not shown, in arms 33 to pivotably link arms 33 together. Alternatively, hinge plates 31 and 32 can be eliminated and the arms 33 may be integrally formed as part of the upper and lower planar members 15 and 17. A feature of the above-described hinge arrangement is that the upper and lower planar members 15 and 17 can be made identical to one another so that they are interchangeable and thus may provide savings in production costs.

To prevent upper plate member 15 and seat 11 from swinging upward beyond its initial spacing from plate member 17, a lock or stop pin 35 is inserted through suitable openings, not shown, near the bottom of the hinge arms 33 which extend upward from lower plate member 17 at a location such that pin 35 is generally resting against the lower edge at the front of the hinge arms 33 which extend downward from upper plate member 15. A ring or lanyard 36 attached to one end of pin 35 is provided to make it relatively easy to remove pin 35 to allow the upper and lower members 15 and 17 to be swung apart if necessary to gain access into the space between the plate members. As mentioned earlier, in the embodiment illustrated in FIG. 6, stop pin 35 would likely not be needed.

As mentioned earlier, the material for the shock-absorbing pads 21 is a matter of choice depending upon, inter alia, the nature of the application, the forces that might be encountered, the bulk or weight of the boat operator, etc. The material should be an elastomer and the degree of resiliency or the durometer of the material also is a matter of choice. Because of the adjustability feature and the ease with which pads 21 can be removed and replaced, the device can be used in a wide range of applications, including a variety of boat seats for different types of boats which may have significant different power so that the forces encountered may vary over a wide range. The nature of the invention is such that it may have application to other boat uses such as on boat floors or decks. While the padding 21 is illustrated and described as being columnar in part and having flanges at one or both ends, it is contemplated that the padding can be of different sizes and shapes to achieve the intended purpose and same result in the same fashion. Also, a single pad member may be used.

Although the preferred form of the invention has been illustrated and described as an assembly having top and bottom plate members suitable for attachment respectively to the underside of a boat seat and to the top side of a support such as the boat deck, it is contemplated that the underside of a boat seat could constitute the upper member and the upper side of the support, such as the boat deck or top of a pedestal or column, could constitute the lower member. In that fashion, then, the boat seat, per se, would be hingedly attached to the support along a line parallel to the front edge of the boat seat and the underside of the boat seat would be spaced above the support surface with the shock-absorbing or attenuating limiting padding suitably located in the space between the underside of the boat seat and the support surface.

I claim:

1. Shock absorber device for a boat seat, comprising:
   a first member for supporting the underside of a boat seat;
   a second member located and spaced below said first member;
   a hinge pivotably linking together said first and second members along a line generally parallel to the front edge of the boat seat; and
   at lease one resilient pad coupled between said first and second members for absorbing the force of an impact to the boat seat, said pad adjustably slidably movable between said members.

2. The boat seat shock absorber device as described in claim 1 further including a manually removable stop preventing said hinged first and second members from swinging away from one another beyond said spacing.

3. The boat seat shock absorber device as described in claim 1 wherein said resilient pad is columnar, at least in part.

4. The boat seat shock absorber device as described in claim 1 wherein said pad has an end flange and further including a track located between said first and second members slidably engaging said flange whereby said pad is slidably adjustable between said members.

5. The boat seat shock absorber device as described in claim 1 wherein said pad has an upper and lower flange and further including a track extending rearward from said hinge on the underside of said first member engaging the pad upper flange and a track on the upperside of said second member engaging the pad lower flange whereby said pad is slidably movable between said members along said tracks.

6. The boat seat shock absorber device as described in claim 1 wherein said first and second members are substantially planar.

7. A boat seat shock absorber system comprising:

a first generally planar member for supporting the underside of a boat seat;

a second generally planar member located below said first planar member with a spacing between said planar members;

a hinge pivotably linking together said planar members along a line generally parallel to the front edge of the boat seat; and multiple laterally spaced resilient pads coupled between said planar members for absorbing the force of an impact to the boat seat, said pads adjustably slidably movable between said planar members.

8. The boat seat shock absorber system as described in claim 7 further including a manually removable stop preventing said planar members from swinging away from one another beyond said spacing.

9. The boat seat shock absorber system as described in claim 7 wherein said resilient pads are columnar, at least in part.

10. The boat seat shock absorber system as described in claim 7 wherein each of said pads has an end flange and further including multiple tracks, each of said tracks slidably engaging a respective one of said flanges whereby said pads are separately slidably movable between said members.

11. The boat seat shock absorber system as described in claim 7 wherein each of said pads has an upper and lower flange and further including a set of tracks extending rearward from said hinge on the underside of said first planar member slidably engaging the upper flange of said pads and a set of tracks on the upper side of said second planar member slidably engaging the lower flange of the said pads whereby said pads are slidably adjustable between said planar members along said tracks.

* * * * *